Figure 1:
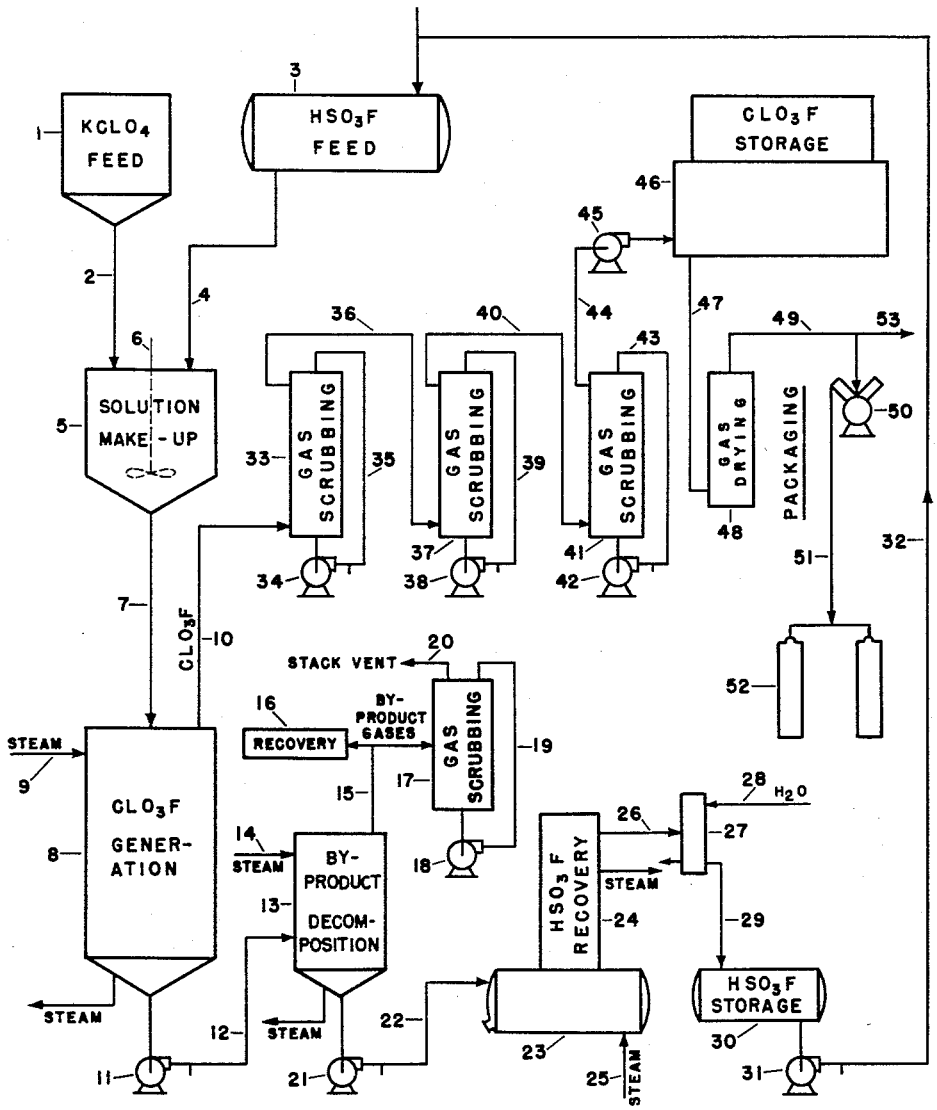

GERHARD BARTH-WEHRENALP INVENTOR.

United States Patent Office 2,942,948
Patented June 28, 1960

2,942,948

CHEMICAL PROCESS FOR THE PURIFICATION OF PERCHLORYL FLUORIDE AND RECOVERY OF FLUOSULFONIC ACID

Gerhard Barth-Wehrenalp, Elkins Park, Pa., assignor to Pennsalt Chemicals Corporation, a corporation of Pennsylvania Filed Dec. 21, 1956, Ser. No. 629,853

7 Claims. (Cl. 23—203)

This invention relates to perchloryl fluoride, $ClO_3F$. More particularly it pertains to improvements in methods for the preparation of $ClO_3F$ by reaction of a perchlorate with a fluorinating agent.

Perchloryl fluoride may be prepared by reacting a perchlorate with fluosulfonic acid, as described in co-pending application Serial No. 554,622, filed December 22, 1955, by William A. La Lande, Jr.

During the reaction of a perchlorate with fluosulfonic acid, as in the above identified process, one or more complex oxygen-chlorine-sulfur dioxide compounds, as for example $(ClO_2)_2S_3O_{10}$, are formed about as readily as the perchloryl fluoride. These complex compounds decompose during continued heating at the perchloryl fluoride formation temperature to form gaseous by-products. These by-product gases are undesirable contaminants in the perchloryl fluoride product stream leaving the $ClO_3F$ generator. The gaseous by-products are principally chlorine, oxygen and sulfur trioxide. A major handling problem, from a large-scale production standpoint, is presented by the large volume of these gases eventually evolved through the continual decomposition of said complex by-product compounds to the elemental gases during the production of $ClO_3F$ and under the conditions present in the $ClO_3F$ generator.

Removal of the gaseous by-products from the $ClO_3F$ gas stream can be achieved by contacting the stream with a solution of an alkali, such as caustic soda, and a solution of a reducing agent, such as sodium thiosulfate, in succession or in admixture. This gas washing procedure requires the use of large quantities of neutralizing and reducing agent solutions in order to ensure that the perchloryl fluoride is recovered free of the contaminant gases. On a production scale the operation becomes both expensive and cumbersome.

Another problem presented by the complex by-product compounds is that the compounds, if they remain in the fluorinating agent reaction mass in an undecomposed form, make difficult the economic disposal of the residual reaction mass. If, for example, the reaction mass is rapidly cooled after the $ClO_3F$ generation step has been completed, the decomposition of the complex by-product compounds is inhibited. But on reheating the mass, the decomposition is resumed, thus making hazardous the storage of the reaction mass in unvented vessels. Under these circumstances, the fluorinating agent in the spent reaction mass is not reusable for the generation of $ClO_3F$; therefore, procedures for safely and efficiently recovering the fluorinating agent are highly desirable.

I have now invented improvements in said perchloryl fluoride manufacturing process. My improved process solves the problems presented by the complex by-product compounds both with respect to the recovery of $ClO_3F$ and with respect to the recovery of the fluosulfonic acid from the process.

I have found that perchloryl fluoride can be made initially and substantially free of a major portion of the above-mentioned by-product gases. Further, I have found that the complex by-product compounds formed during the perchloryl fluoride formation reaction can be isolated and decomposed separate from the perchloryl fluoride production system and converted to gases which may be recovered as economically desirable by-products.

Still further, I have found that the fluosulfonic acid in the residual reaction mass remaining from the generation of $ClO_3F$ and from said complex by-product compounds decomposition step may readily be recovered from the mass in a purified form for reuse in the perchloryl fluoride generation process.

According to the method of my invention, perchloryl fluoride which is initially and substantially free of a major portion of contaminant by-product gases is prepared from a perchlorate and fluosulfonic acid by reacting a solution of said reactants under conditions causing formation of perchloryl fluoride, evolving the perchloryl fluoride, and isolating the residual reaction mass from the perchloryl fluoride recovery system at about the end of said perchloryl fluoride evolution period before more than a minor portion of the above described complex by-product compounds have had time to be transformed into gaseous compounds.

The accompanying drawing illustrates diagrammatically one method for conducting a process embodying principles of my invention.

In one embodiment of my invention a solution of the reactants is flowed into and out of a $ClO_3F$ generator 8 at a flow rate which is slow enough to permit the $ClO_3F$ formation reaction to go to completion but which is not sufficiently slow to permit the gas-forming complex by-product compounds to decompose to form more than a minor amount of gaseous compounds during the period that the reaction mass is retained in the reactor. The residual reaction mass is thereafter isolated from the perchloryl fluoride generation system and is heated until decomposition of the complex by-product compounds to elemental chlorine, oxygen, and sulfur trioxide is substantially completed and evolution of gaseous products from the mass ceases. The reacted mass is then further heated to distil off the residual fluosulfonic acid, which is recovered and reused in the $ClO_3F$ generation step. The steps of the process are preferably carried out in a continuous manner.

In a preferred embodiment of my invention, a solution containing 10 parts of potassium perchlorate dissolved in about 100 parts of fluosulfonic acid is fed continuously into a vertical packed tower type reactor where the solution is heated rapidly to a temperature of from about 100 to 135° C. and reacted at that temperature for from about 1 to 10 minutes, the shorter time being used at the higher temperature. Preferred reaction conditions are about 105 to 110° C. for about 5 minutes. Perchloryl fluoride gas begins to form immediately and is removed continuously from the system by use of a slight suction. At about the end of the reaction period, as evidenced by evolution of only traces of $ClO_3F$ from samples of the residual mass at the bottom of the reactor the residual reaction mass is continuously withdrawn and is promptly isolated from the perchloryl fluoride generation and recovery system. In practice, the reaction is carried out in a reactor vessel into which the reactants flow continuously, and the perchloryl fluoride leaves as a gaseous overhead product, while the liquid residual reaction mass containing the complex by-product compound passes out at the bottom of the vessel at the end of the prescribed retention period.

The perchloryl fluoride leaving the system is substantially free of the gaseous by-products normally present in the gas stream of the product when the process of my invention is not used. When my process is used, gaseous by-product compounds have not had sufficient time to form in the reaction mass in undesirable amount, because of the short elapsed time of contact of the reactants at the reaction temperature.

To remove entrained reactants and as a precaution, should more than minor amounts of said by-product gaseous compounds inadvertently be formed, as is possible if an imbalance in the feed and withdrawal rate were used, the crude perchloryl fluoride is passed through an aqueous scrubbing solution containing from about 10 to 25% caustic soda mixed with about 10 to 25% of sodium thiosulfate. A dilute caustic soda of about 5 to 10% NaOH content may be used as a follow-up wash, which may be followed finally by a water wash before the gas goes to a gas-holder. The $ClO_3F$ is passed over a drying agent, such as solid caustic soda, to dry it before packaging it. The $ClO_3F$ thus made is over 99% in purity, the impurity consisting mainly of oxygen or air.

The residual liquid reaction mass leaving the reactor can be chilled to inhibit decomposition of the complex by-product compounds to the elemental gases. However, since upon reheating, the decomposition reactions will resume, I have found it preferable, after removing the reaction mass from the $ClO_3F$ reactor to maintain the temperature of the mass in a separate reactor at the perchloryl fluoride formation temperature and to permit the decomposition of the complex by-product compounds to take place, evolving the resulting chlorine, oxygen and sulfur trioxide gases from the decomposition reactor system as they form. The above complex compounds are unstable at elevated temperatures. I have found that by gradually heating the reaction mass to its boiling point and refluxing at that temperature, the complex by-products are completely decomposed and evolved smoothly from the reaction mass as gaseous by-products. According to one embodiment of my process, the evolved gases are usually passed to an alkaline scrubbing system. When large volumes of gases are produced in large scale operations, recovery of the gases in a useful form may, of course, be carried out using procedures well-known in the art.

When the evolution of the gases from the reacted mass has ceased, boiling of the mass is continued and the fluosulfonic acid is recovered by using standard distillation procedures. The previously unusable fluosulfonic acid can thus, by the process of my invention, be recovered in purified form, and can be reused as a reactant in the perchloryl fluoride generation process.

The duration of the retention time of the reactants in the perchloryl fluoride generator at a particular temperature is important to the success of my improved $ClO_3F$ process. If the time is too short, yields of $ClO_3F$ will be low, as unreacted perchlorate will leave the system with the residual reaction mass. If retention time is excessive, the undesired side reactions above will have time to go to completion in the $ClO_3F$ reactor and the contaminant gases will be released with the perchloryl fluoride.

The optimum retention time for each reaction temperature may, of course, be determined by experimental procedure; therefore, it is not my intent to be restricted to any specific combination of time and temperature. However, I have found that the highest yields of $ClO_3F$ which is substantially free of the gaseous by-products are obtained when the $ClO_3F$ generation reaction is carried out using a retention time of about 5 minutes at about 105° C. and I prefer to use these conditions of operating time and temperature.

At higher temperatures the rate of formation of complex by-products increases and very short retention periods are required. For example, at temperatures in the range of 130–135° C. retention times of under 2 minutes are suitable. At temperatures under 100° C. retention periods of about 10 minutes to about 30 minutes or longer at lowest reactive temperatures may be used and are generally required to get high yields of $ClO_3F$.

The invention and its practice is made apparent in further detail by reference to the attached drawing, Figure 1, which illustrates the steps of my improved process for preparing $ClO_3F$, i.e. the perchloryl fluoride generation step, the by-product decomposition step, and the fluosulfonic acid recovery step. Figure 1 also shows facilities for purifying, storing and packaging $ClO_3F$. Shown also are facilities for recovering the by-product gases, if such recovery is desired, and for scrubbing and venting the gases if recovery of these gaseous products is not desired.

Referring now to Figure 1 in detail, crystalline perchlorate, from storage bin 1 and fluosulfonic acid from storage tank 3 are charged continuously in the desired weight ratios, using conventional metering equipment, via lines 2 and 4 into mixing tank 5 where the perchlorate is dissolved into the fluorinating agent and kept stirred by agitator 6. The solution of reactants is metered via line 7 into the $ClO_3F$ generator 8 which is externally heated to reaction temperature by steam from line 9. $ClO_3F$ gas leaves the generator via line 10.

Following now the flow of the residual reaction mass, said mass is continuously transferred by pump 11 via line 12 to the by-product decomposer 13 which is externally heated by steam from line 14. By-product gases are evolved continuously via line 15. The gases may be directed to a customary recovery system 16 or may be reacted in gas scrubber 17 in which caustic soda solution is continuously circulated by pump 18 through line 19. In the latter case unabsorbed gases are vented to the air through a vent stack via line 20.

The degasified mass from the decomposer 13 is transferred by pump 21 via line 22 to recovery still 23 which is heated externally by steam from line 25. The fluosulfonic acid distills up the column 24, which is a two to three plate unit, passes via line 26 to the condenser 27 which is cooled by water from line 28. The liquefied cooled fluosulfonic acid passes via line 29 to storage tank 30 from which it is transferred by pump 31 via line 32 to the fluosulfonic acid feed tank 3.

Returning now to the $ClO_3F$ flowing from $ClO_3F$ generator 8 via line 10, we follow the $ClO_3F$ as it enters gas scrubber 33 where it is contacted with an aqueous caustic soda-sodium thiosulfate solution continuously circulated by pump 34 via line 35. The scrubbed $ClO_3F$ passes via line 36 to gas scrubber 37 where it is further scrubbed with dilute aqueous caustic soda solution continuously circulated by pump 38 via line 39. The $ClO_3F$ then passes via line 40 to gas scrubber 41 where it is given a final wash with water continuously circulated by pump 42 via line 43. The washed $ClO_3F$ gas then passes via line 44 through gas blower 45 into the $ClO_3F$ gas holder 46.

When the $ClO_3F$ gas is to be packaged or used directly, it is taken from the gas holder 46 via line 47 from which it passes through the gas dryer 48 which contains a customary drying agent, such as activated alumina or caustic soda. The gas then goes via line 49 directly to a use area via line 53, or if it is to be packaged, passes into compressor 50, then into manifold 51 and into storage cylinders or tanks 52.

The residue from the fluorinating agent recovery operation consists of a sludge. This sludge is removed at appropriate intervals by blow-down from the recovery vessel 23.

As indicated on line 32, new $HSO_3F$ may be charged directly to the system to replenish that consumed in the process. Scrubbing solutions used in gas scrubbers 17, 33, 37 and 41 will need to be replaced as their effectiveness is depleted. The solutions are preferably prepared in an external system, not shown, from which they can be charged into the circulating lines of the respective gas scrubbers.

In the preferred practice of my process the $HSO_3F$ is recovered for reuse in the process. However, should recovery of $HSO_3F$ for this process not be desired, the residual reaction mass can be discharged by pump 11 or 21 through the side outlet of line 12 or 22, respectively, to another use area or to a neutralizing pond, not shown.

The practice of my invention is still further made clear by the following examples, in which the parts are by weight.

Example 1 a. 1 part $KClO_4$ and 10 parts of $HSO_3F$ were mixed with stirring to form a solution and were reacted in a batch-type reaction vessel at 105° C. The $ClO_3F$ which formed was evolved from the vessel as an impure yellowish gas mixed with chlorine, sulfur trioxide and oxygen. The gas was passed through washing vessels containing 10% solutions of caustic soda and sodium thiosulfate. The chlorine and sulfur trioxide were removed by the washing solutions. The $ClO_3F$-oxygen mixture was cooled in a low temperature bath where the $ClO_3F$ was liquefied as a colorless liquid and the oxygen was vented to the atmosphere. The residual reaction mass was orange in color.

b. 10 parts of $KClO_4$ were dissolved in 100 parts of fluosulfonic acid. The solution was fed in a fine stream into the top of a vented vertically mounted vessel which was packed with acid resistant packing material and heated in the range of from 105 to 110° C. Free space in the packed vessel was about 40%. Retention time of the solution in the reactor was about 4½ minutes, representing the time for the liquid to flow from the top of the reactor to the outlet at the bottom. The reaction temperature through the retention period in the reactor was held at about 105° C. Perchloryl fluoride formed as a gas. It was collected from the top of the reactor into a suitable gasholder from which it was later liquefied. A yield of 60.2% of $ClO_3F$ was obtained, based on weight of perchlorate charged. Purity was over 90% $ClO_3F$.

The fluosulfonic acid solution containing the by-products of the reaction, and representing the residual reaction mass, left the reactor at the bottom. The liquid at this stage was a dark orange color. The residual reaction mass was placed in a vented vessel and was heated gradually to the boiling point. During the heating the complex by-product compounds present in the mass were decomposed to elemental gaseous chlorine, oxygen and sulfur trioxide. The gases were evolved from the fluosulfonic acid reaction mass solution and passed into an alkali scrubbing solution where the chlorine and sulfur trioxide were absorbed, and the oxygen was vented to the air. When the evolution of gases had ceased, the fluosulfonic acid in the residue was distilled off and recovered, ready for reuse in the $ClO_3F$ generation step.

From the comparison of the colors of the $ClO_3F$ gases evolved in runs a and b it is seen that timely removal of the residual reaction mass from the reaction zone results in recovery of $ClO_3F$ free from chlorine and other gases.

Example 2 a. 1 part of $KClO_4$ and 10 parts of $HSO_3F$ were mixed with stirring in a batch-type reaction vessel at 25° C. The solution was heated gradually to evolve $ClO_3F$. Evolution of $ClO_3F$ was rapid in the range 85° to 100° C. When the gas evolution slowed, the reaction mass was heated at gradually increasing temperatures to about 150° C. or until evolution of gases ceased. A yield of 52% of $ClO_3F$, based on $KClO_4$ charged, was obtained. The reaction mass was dark orange in color. It was cooled and used in part b.

b. 1 part of $KClO_4$ and about 12 parts of the $HSO_3F$-containing reaction mass of part a (equivalent to 10 parts of $HSO_3F$ on the basis of $SO_3$ analysis) were mixed and reacted as in part a. A yield of only 15% $ClO_3F$, based on $KClO_4$ charged, was obtained. The reaction mass was of a dark orange color.

The residual reaction mass is thus shown to be unsuitable for reuse in the $ClO_3F$ generation process.

Example 3 a. The $HSO_3F$-containing reaction mass residue from a $ClO_3F$ preparation based on a charge of 1 part $KClO_4$ to 10 parts of $HSO_3F$ was heated to decompose complex by-product compounds and was then distilled at atmospheric pressure. 7.8 parts of distilled $HSO_3F$ were recovered, B.P. 180°–185° C.

b. The distilled $HSO_3F$ was mixed with $KClO_4$ in the ratio of 1 part $KClO_4$ to 10 parts distilled $HSO_3F$ and the mixture was reacted as in Example 2, part a. 3.6 parts of $ClO_3F$ were recovered.

c. Distilled $HSO_3F$ from a previous $ClO_3F$ preparation was mixed with fresh $HSO_3F$ in the ratio of 7 parts distilled to 3 parts fresh $HSO_3F$. The mixture was reacted with $KClO_4$ in the ratio of 1 part $KClO_4$ to 10 parts $HSO_3F$ to form $ClO_3F$. 3.6 parts of $ClO_3F$ were recovered.

d. All fresh $HSO_3F$ was used as in c for the preparation of $ClO_3F$. 3.6 parts of $ClO_3F$ were recovered.

Comparing runs b, c and d it is seen that the $HSO_3F$ recovered in run a and used either alone, as in run b, or mixed with fresh $HSO_3F$, as in run c, gives as good yields of $ClO_3F$ in the $ClO_3F$ generation process as does fresh $HSO_3F$ in run d.

The perchlorates which are preferably used in the process described in the co-pending patent application referred to above include perchloric acid and the perchlorates selected from the group of alkali metal and alkaline earth metal perchlorates consisting of potassium, sodium, calcium, magnesium and lithium perchlorates. My process, as described throughout this specification, applies to all combinations of such perchlorate compounds with fluosulfonic acid for the preparation of perchloryl fluoride.

Many widely different embodiments of this invention may be made without departing from the scope and spirit of it, and it is to be understood that my invention includes also such embodiments and is not to be limited by the above description.

I claim:

1. In the process for the preparation of perchloryl fluoride which comprises reacting an inorganic perchlorate with a stoichiometric excess of fluosulfonic acid, the improvement which comprises the steps of reacting a solution of the perchlorate in fluosulfonic acid at a temperature in the range between about 40° C. and the boiling point of the reaction mass for a reaction time sufficiently long to permit formation of perchloryl fluoride and less than sufficient to form more than a minor amount of by-product gases, evolving said perchloryl fluoride in gaseous form, immediately removing the residual reaction mass from the perchloryl fluoride generation and recovery vessel at the end of said reaction period, further reacting and heating said residual reaction mass until evolution of gaseous products substantially ceases, and recovering fluosulfonic acid from said mass.

2. In the process for the preparation of perchloryl fluoride which comprises reacting an inorgonic perchlorate with a stoichiometric excess of fluosulfonic acid, the improvement which comprises the steps of reacting a solution of said reactants for a reaction time sufficiently long to permit formation of perchloryl fluoride and less than sufficient to form more than a minor amount of by-product gases at a temperature in the range between 40° C. and the boiling point of the reaction mass, forming perchloryl fluoride, evolving said perchloryl fluoride in gaseous form, and immediately removing the residual reaction mass from the perchloryl fluoride recovery system at the end of said reaction period.

3. A process for the recovery of fluosulfonic acid from the residual reaction mass of a perchloryl fluoride generation process based on the reaction of a perchlorate with fluosulfonic acid which comprises heating said mass in the range between about 40° C. and the boiling point of the mass at least until gas-forming complex by-product compounds in said mass from said perchloryl fluoride generation process are decomposed to gases, evolving said gases and distilling fluosulfonic acid from said mass.

4. The process of claim 2 carried out in a continuous manner.

5. The process of claim 1 in which at least the perchloryl fluoride generation and by-product gas generation steps are carried out in a continuous manner.

6. In the process for the preparation of perchloryl fluoride which comprises reacting potassium perchlorate with fluosulfonic acid, the improvement which comprises the steps of continuously reacting a solution of the reactants in the ratio of at least six moles of fluosulfonic acid per mole of potassium perchlorate at a temperature of from about 100 to about 135° C. for a reaction period of from about 1 to about 10 minutes; continuously separating gaseous perchloryl fluoride from the reaction mass; and continuously removing the residual reaction mass from the perchloryl fluoride generation vessel at about the end of said reaction period.

7. The process of claim 6 wherein the reactants are in the ratio of about 10 parts by weight of fluosulfonic acid to one part of potassium perchlorate.

References Cited in the file of this patent

UNITED STATES PATENTS 2,447,476   Kulka _____ Aug. 17, 1948